US007068856B2

(12) United States Patent
Albertelli et al.

(10) Patent No.: US 7,068,856 B2
(45) Date of Patent: Jun. 27, 2006

(54) METHOD AND SYSTEM FOR DETERMINING AND CORRECTING IMAGE ORIENTATION ANGLE

(75) Inventors: Lawrence E. Albertelli, Owego, NY (US); David L. Ii, Owego, NY (US); Nina Kung, Owego, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 641 days.

(21) Appl. No.: 10/245,426

(22) Filed: Sep. 17, 2002

(65) Prior Publication Data

US 2004/0052430 A1  Mar. 18, 2004

(51) Int. Cl.
*G06K 9/36* (2006.01)
(52) U.S. Cl. ..................................................... 382/289
(58) Field of Classification Search ................ 382/111, 382/199, 215, 289, 296, 298, 288; 235/462.08; 358/488
See application file for complete search history.

(56) References Cited

U.S. PATENT DOCUMENTS

| 4,435,837 | A | * | 3/1984 | Abernathy ................... 382/111 |
| 4,573,197 | A | | 2/1986 | Crimmins ..................... 382/22 |
| 4,783,829 | A | * | 11/1988 | Miyakawa et al. .......... 382/199 |
| 5,111,514 | A | | 5/1992 | Ohta ............................... 382/9 |
| 5,120,940 | A | * | 6/1992 | Willsie ................... 235/462.08 |
| 5,295,237 | A | | 3/1994 | Park ............................ 395/137 |
| 5,386,482 | A | | 1/1995 | Basso et al. ..................... 382/9 |
| 5,475,803 | A | | 12/1995 | Stearns et al. ............... 395/136 |
| 5,528,387 | A | | 6/1996 | Kelly et al. .................. 358/488 |
| 5,715,385 | A | | 2/1998 | Stearns et al. ............... 395/136 |
| 5,889,893 | A | | 3/1999 | Robson ........................ 382/296 |
| 5,901,253 | A | | 5/1999 | Tretter ......................... 382/289 |
| 6,014,450 | A | | 1/2000 | Heilper et al. .............. 382/101 |
| RE36,656 | E | | 4/2000 | Califano et al. ............. 382/199 |
| 6,064,778 | A | | 5/2000 | Pasco et al. ................. 382/289 |
| 6,173,066 | B1 | | 1/2001 | Peurach et al. ............. 382/103 |
| 6,262,751 | B1 | | 7/2001 | Chan .......................... 345/572 |
| 6,275,622 | B1 | | 8/2001 | Krtolica ...................... 382/296 |
| 6,310,986 | B1 | | 10/2001 | Robey et al. ................ 382/296 |
| 6,466,340 | B1 | * | 10/2002 | Washio ........................ 358/488 |
| 6,668,084 | B1 | * | 12/2003 | Minami ....................... 382/215 |

FOREIGN PATENT DOCUMENTS

EP  0975146 A1  1/2000

OTHER PUBLICATIONS

Yu, B., Jain, A.K, & Mohiuddin, M. (Aug. 1997). Address Block Location on Complex Mail Pieces [Electronic version]. *Document Analysis and Recognition*, 2, 897-901.

(Continued)

*Primary Examiner*—Kanjibhai Patel
(74) *Attorney, Agent, or Firm*—Burns & Levinson LLP; Jacob N. Erlich; Orlando Lopez

(57) ABSTRACT

A simple and robust method for determining the orientation angle of a scanned image or the angular orientation of an object in an electronic image based on using descriptors of the image and systems that implement the method are disclosed. A system including means for acquiring the electronic image, means for determining image centroid coordinates, means for obtaining second order moments corresponding to the image, and, means for determining an orientation angle of a principal axis of the image implements the method.

10 Claims, 5 Drawing Sheets

OTHER PUBLICATIONS

Wang, C., Palumbo, P.W., & Srihari, S.N. (Nov. 1988). Object Recognition in Visually Complex Environments: An Architecture for Locating Address Blocks on Mail Pieces [Electronic version]. *Pattern Recognition*, I, 365-367.

Palumbo, P.W., Srihari, S.N., Soh, J., Sridhar, R., & Demjanenko, V. (Jul. 1992). Postal Address Block Location in Real Time [Electronic version]. *Computer*, 25(7), 34-42.

Wolf, M., Niemann, H., Schmidt, W. (Aug. 1997). Fast Address Block Location on Handwritten and Machine Printed Mail-Piece Images [Electronic version]. *Document Analysis and Recognition*, 2, 753-757.

Schreiber, W. F. (1991). *Fundamentals of Electronic Imaging Systems: Some Aspects of Image Processing* (2nd enl. ed., pp. 170-183). Berlin: Springer-Verlag.

Pratt, W. K. (1978). *Digital Image Processing* (pp. 68-69, 74-78). New York: John Wiley & Sons.

Goldstein, H., Ph.D. (1965). *Classical Mechanics* (7th ed., p. 99). Reading, MA: Addison-Wesley.

PCT International Search Report dated Aug. 13, 2003. Int'l Application No. PCT/US02/33101, filed Oct. 17, 2002.

Stanislav Rost, "Character Recognition—Image and Video Processing," University Class Project, Online! Nov. 1998. Retrieved from http://web.mit.edu/stanrost/www/cs585pl/pl.html. p. 2, line 17-line 24.

Simon Xinmeng Liao, "Image Analysis by Moments," Ph.D. Thesis, Online! University of Manitoba, Winnipeg, Manitoba, Canada, Department of Electrical and Computer Engineering, 1993. Retrieved from http://zernike.uwinnigpeg.ca/{s_liao/education.html. pp. 8-10.

* cited by examiner

METHOD AND SYSTEM FOR DETERMINING AND CORRECTING IMAGE ORIENTATION ANGLE

BACKGROUND OF THE INVENTION

This invention relates generally to image processing methods and systems, and, more particularly to methods and systems for determining and correcting the orientation angle of an image.

When an image is scanned in order to obtain an electronic image, in many instances, the resulting electronic image is rotated (has an angular orientation different from that desired). This phenomenon can occur when a photographic image, text image, or a compound document is scanned. There are also situations of interest, such as automatic targeting and automated tracking, where, although an unintentional rotation is not introduced, the determination of the angular orientation of an object in the image is desired.

In view of the ubiquity of the problem in electronic image processing, a number of angular orientation detection methods have been proposed. Early angular orientation detection methods required the presence of text in the image. More recently, angular orientation detection methods have been described that require determining an edge in the image and determining, from that edge (or line), the orientation angle (see, for example, U.S. Pat. No. 5,901,253, "Image Processing System with Image Cropping and Skew Correction", issued on May, 1999, and U.S. Pat. No. 5,528,387, "Electronic Image Registration for a Scanner", issued on Jun. 18, 1996).

Methods that determine the orientation angle by finding straight lines or edges can encounter difficulties if the image is not rectangular or if the content of the image is rotated compared to the outline of the image. The latter example can be representative of the images obtained through address block location when the address is handwritten. For example, the method described in U.S. Pat. No. 5,901,253, detects multiple orientation angles when the image shape is oval. In that method, further processing is then necessary to determine the actual orientation angle of an image of oval shape.

Also, methods that determine the orientation angle by finding straight lines or edges are computationally intensive as can be inferred from the flow charts given in U.S. Pat. No. 5,901,253, U.S. Pat. No. 5,452,374, and U.S. Pat. No. 5,528,387. There is a need for a simple and robust method of determining the orientation angle of a scanned image or the angular orientation of an object in an image. There is also a need for a method that can be applied to images of different shapes and types.

BRIEF SUMMARY OF THE INVENTION

The present invention discloses a simple and robust method for determining the orientation angle of a scanned image or the angular orientation of an object in an electronic image based on using descriptors of the image and systems that implement this method. The method begins with an electronic representation of the image, such as that obtained from a scanner. An electronic representation of an image converts the information contained in a two dimensional image of a scene into an electronic signal, the value or quantity of the electronic signal being a measure of the intensity of the light in the image. The electronic signal can include a series of one-dimensional signals as in the case of a raster scanned image or it can include a two dimensional array of discrete image values, as in the case of a digitally scanned image. Any operation, such as rotation, on the electronic image actually refers to manipulating the corresponding values on the electronic image. The method for determining the orientation angle of a scanned image or the angular orientation of an object in an electronic image includes the following steps. The zeroth order and first order moments of the image values are calculated. The image centroid coordinates are determined from the zeroth and first order moments. Then, utilizing the image centroid coordinates and the electronic representation of the image, the second order moments corresponding to the image are obtained. The orientation angle of the principal axis of the image is obtained from the second order moments. The orientation angle of the image is given by the orientation angle of the principal axis. The method is readily implemented and has minimal computational complexity. If correction of the orientation angle is desired, the electronic image is rotated by an angle equal to the orientation angle of the image and in a direction that yields a rotated image with a substantially null orientation angle.

A system including means for acquiring the electronic image, means for determining image centroid coordinates, means for obtaining second order moments corresponding to the image, and, means for determining an orientation angle of a principal axis of the image implements the method. If correction of the orientation angle is desired, means for rotating the image are also included in the system.

For a better understanding of the present invention, together with other and further objects thereof, reference is made to the accompanying drawings and detailed description and its scope will be pointed out in the appended claims.

DETAILED DESCRIPTION OF THE INVENTION

A simple and robust method for determining the orientation angle of a scanned image or the angular orientation of an object in an electronic image based on using descriptors of the image and systems that implement the method are disclosed. The method and systems utilize an electronic representation of the image, such as that obtained from a scanner. An electronic representation of an image, hereinafter called an electronic image, converts the information contained in a two dimensional image of a scene into an electronic signal, the quantitative value (such as a current, voltage or a digital value) of the electronic signal being a measure of the intensity of the light in the image. The electronic signal can include a series of one-dimensional signals as in the case of a raster scanned image or it can include a two dimensional array of discrete image values, as in the case of a digitally scanned image. Hereinafter, the embodiment of the electronic signal as a two dimensional array of discrete image values is presented. While the method disclosed is equally applicable to other representations of the electronic signal, those representations, which are apparent to those skilled in the art, are presented as modifications to the discrete image value representation.

Figure 1:
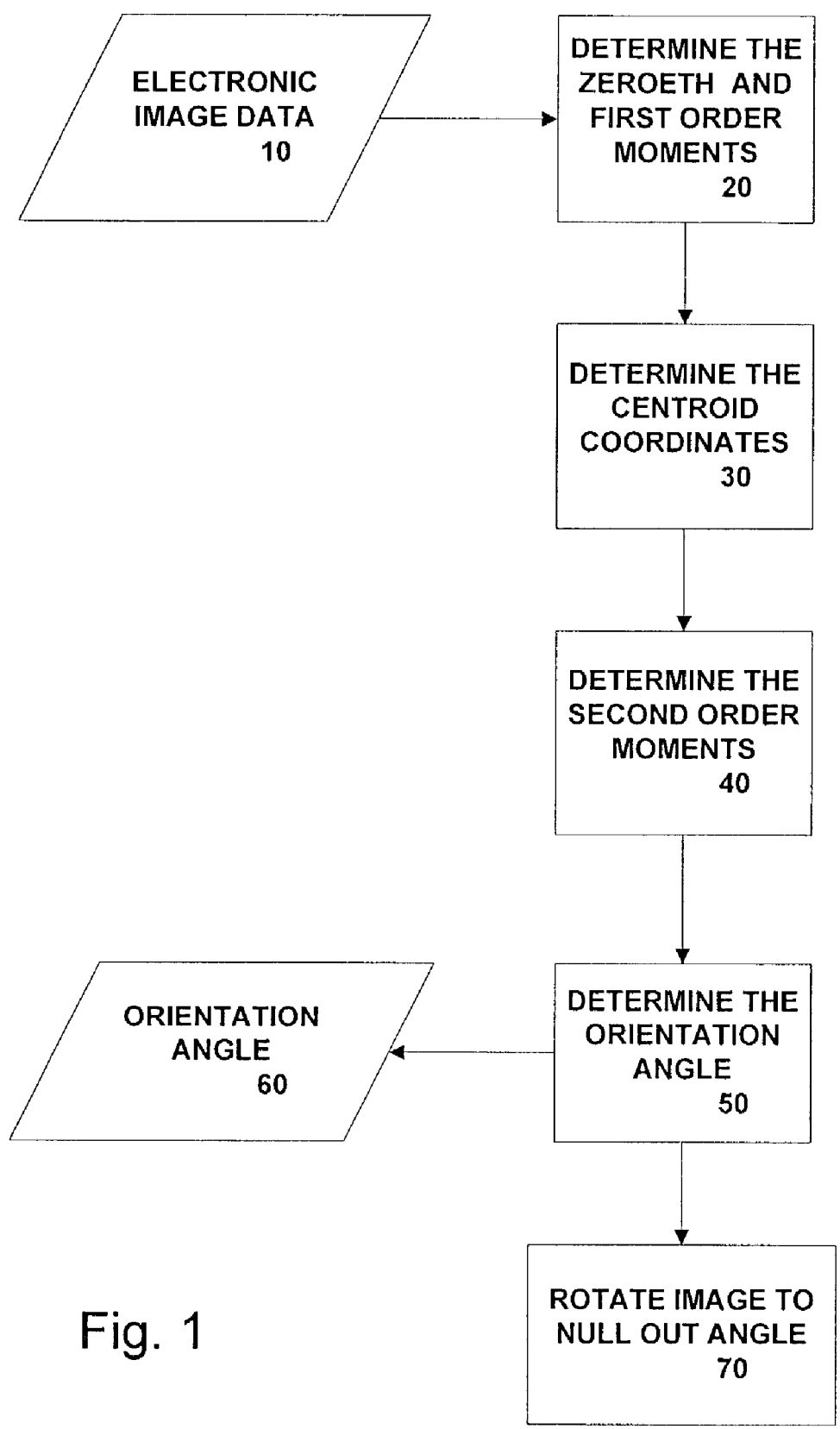
FIG. 1 is a flowchart of an embodiment of the method of this invention for determining the orientation angle of a scanned image or the angular orientation of an object in an electronic image.
Figure 2:
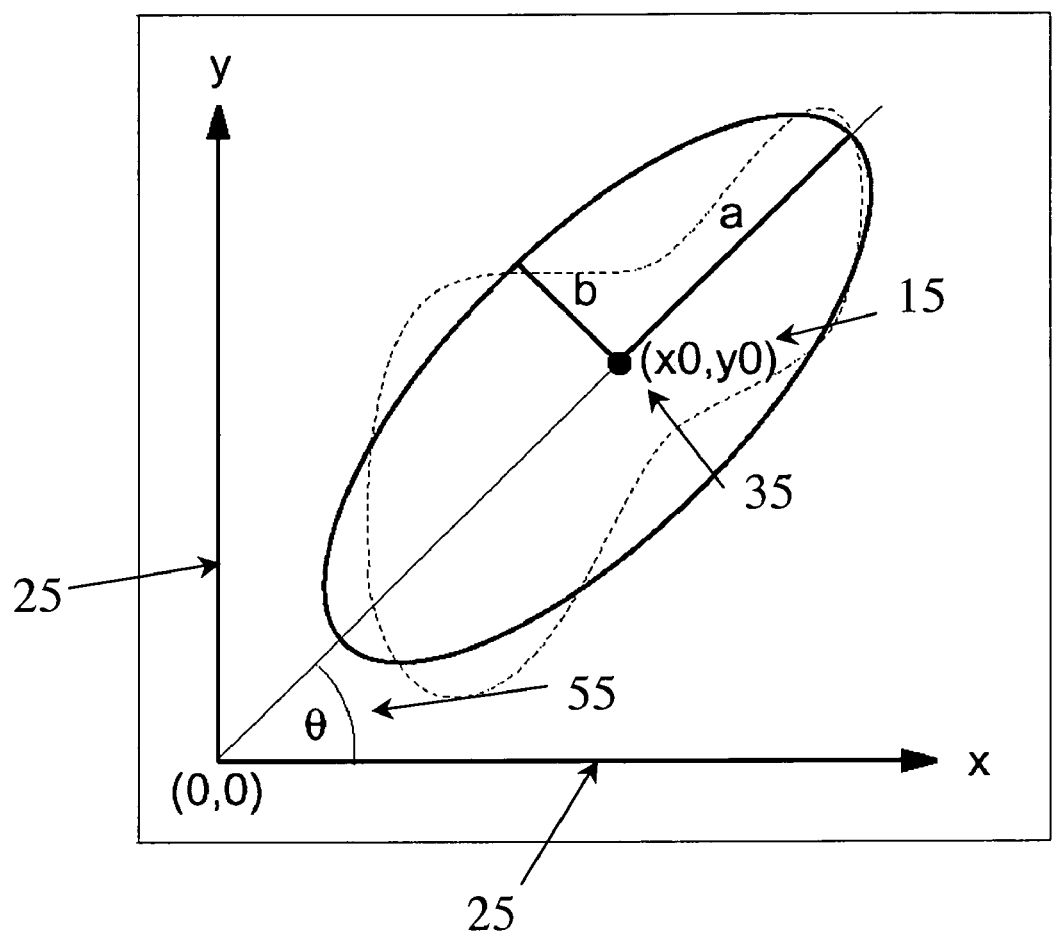
FIG. 2 is graphical representation of the orientation angle of the principal axis of an image.

A flow chart representative of an embodiment of the method of this invention is shown in FIG. 1. Referring to FIG. 1, the electronic image data 10 provides the input data for the method. Referring to FIG. 2, the image 15 is referenced to the coordinate axes 25. In the embodiment in which the electronic signal comprises a two dimensional array of discrete image values, the electronic image data is represented by $$f(x_i, y_j) i=1, \ldots, n, j=1, \ldots, m$$

where f(x,y) represents the image value and $x_i$, $y_j$ represent the x and y coordinates of a discrete point at which the value is known. The zeroth order and first order moments of the image values are calculated from the electronic image data 10 (step 20, FIG. 1) by $$m_{00} = \sum_{i=1}^{i=n} \sum_{j=1}^{j=m} f(x_i, y_j)$$

$$m_{10} = \sum_{i=1}^{i=n} \sum_{j=1}^{j=m} x_i f(x_i, y_j)$$

$$m_{01} = \sum_{i=1}^{i=n} \sum_{j=1}^{j=m} y_j f(x_i, y_j)$$

The coordinates of the image centroid 35 (FIG. 2) are then determined from the zeroth and first order moments (step 30, FIG. 1) by $$x_0 = \frac{m_{10}}{m_{00}}$$

$$y_0 = \frac{m_{01}}{m_{00}}$$

Next, the second order moments, $\mu_{11}$, $\mu_{20}$ and $\mu_{02}$ are obtained from the image centroid coordinates 35 and the image values (step 40, FIG. 1) by $$\mu_{pq} = \sum_{i=1}^{i=n} \sum_{j=1}^{j=n} (x_i - x_0)^p (y_j - y_0)^q f(x_i, y_j) \quad p, q = 0, 1, 2, \ldots.$$

The orientation angle of the principal axis of the image 55 (FIG. 2) is obtained from the second order moments (step 50, FIG. 1) by $$\theta = \frac{1}{2} \tan^{-1}\left(\frac{2\mu_{11}}{\mu_{20} - \mu_{02}}\right)$$

The orientation angle 60 of the image (FIG. 1) is given by the orientation angle 55 of the principal axis (FIG. 2).

The embodiment disclosed above can be easily modified for other representations of the electronic signal. For example, if the electronic signal is a raster scanned signal, one of the summations in the equations for the first and second order moments, the one corresponding to raster scan direction, would be replaced by an integration.

It is known in color science that any color can be represented by three numbers or three basic colors (see, for example W. F. Schreiber, *Fundamentals of Electronic Imaging Systems,* Second edition, Springer—Verlag, New York, N.Y., 1991, pp. 170–182). If the electronic signal is a color signal, the electronic image data is represented by $$f_c(x_i, y_j) i=1, \ldots, n, j=1, \ldots, m, c=c1, c2, c3.$$

That is, at every discrete point, three color values (red, green, blue, for example) describe the image. (Other color representations are possible which could use more than three variables. However, any color representation with more than three variables can be reduced to a three variable representation.)

In representing color, any spectral distribution of light, such as "white light", can be represented by variable amounts of three primary spectra. Tristimulus values can be obtained from any illuminant (any light spectrum) by the integral over wavelengths of the product of the illuminant spectrum and the primary spectrum. Also, since any real color can be represented by three numbers, any real color can be represented as a point in a three dimensional space. In such a space, all points on a line through the origin have the same ratio of the three primary colors and differ only in brightness or "luminance". In one embodiment, only the luminance, $L(x_i, y_j)$, at each point in the image is used to define the rotation of a color image. In that embodiment, the definitions of zeroth, first order moments, and second order moments for color images are obtained by replacing $f(x_i, y_j)$ in the equations above with $L(x_i, y_j)$. The orientation angle 55 of the principal axis of the color image (FIG. 2) is, then, obtained from the second order moments (step 50, FIG. 1) as described above. The orientation angle 60 of the color image (FIG. 1) is given by the orientation angle 55 of the principal axis (FIG. 2).

Different representations of "luminance" are possible. According to one of the axioms of color matching, the luminance of a color mixture is equal to the sum of luminance of its components (see, for example, W. K. Pratt, Digital Image Processing, ISBN 0-471-01888-0, p. 6, 68–69). The sum of luminance of the tristimulus components provides an expression for luminance (W. K. Pratt, op. cit., p. 69). However, unit increments in luminance, as defined above, are not uniformly perceptible. Color coordinate systems, such as CIE Luv and CIE Lab, have been developed that provide a uniformly perceptible quantity, L, related to luminance (W. K. Pratt, op. cit., p. 74–78). In one embodiment, the quantity L, in either CIE Luv or CIE Lab color representations, can be used in place of luminance. In another embodiment, the luminance is approximated by one fourth of the red color (tristimulus) value plus one half of the green value plus one eighth of the blue value. In yet another embodiment, the Y value in the CIE XYZ color coordinate system is equivalent to the luminance. All of these representations and embodiments of luminance are within the scope of this invention and will be referred to herein after as luminance.

Once the orientation angle of an image is known, the image can be rotated by an angle equal to the orientation angle of the image and in a direction that yields a rotated image with a substantially null orientation angle, thereby correcting the orientation of the image. Rotation is accomplished by rotation means known in the art such as given in H. Goldstein, Classical Mechanics, Addison Wesley, New York, N.Y., 1950, p. 99. Rotation is a transformation of coordinates such that, after rotation, $f(x_i,y_j)$ is transformed into $f(x'_i,y'_j)$. That is, the same image value is retained but, after transformation, it is associated the point $(x'_i,y'_j)$, where $(x'_i,y'_j)$ are the coordinates after rotation. Since the coordinates after rotation are, most likely, not located at the discrete points at which the image is described, interpolation is usually required. A variety of other methods for rotating an image have been developed, such as those described in U.S. Pat. No. 5,475,803 and references described therein. Or, in order to make the rotation procedure less computationally and memory intensive, other or additional means can be utilized, such as described in U.S. Pat. No. 6,275,622, U.S. Pat. No. 6,310,986, in U.S. Pat. No. 5,889,893 and in col. 14, lines 1–25 and FIG. 35 of U.S. Pat. No. 5,111,514 (for the embodiment in which the electronic signal comprises a two dimensional array of discrete image values) and U.S. Pat. No. 6,262,751 (for the embodiment in which the image signal is displayed in a raster scan display device).

Figure 3A:
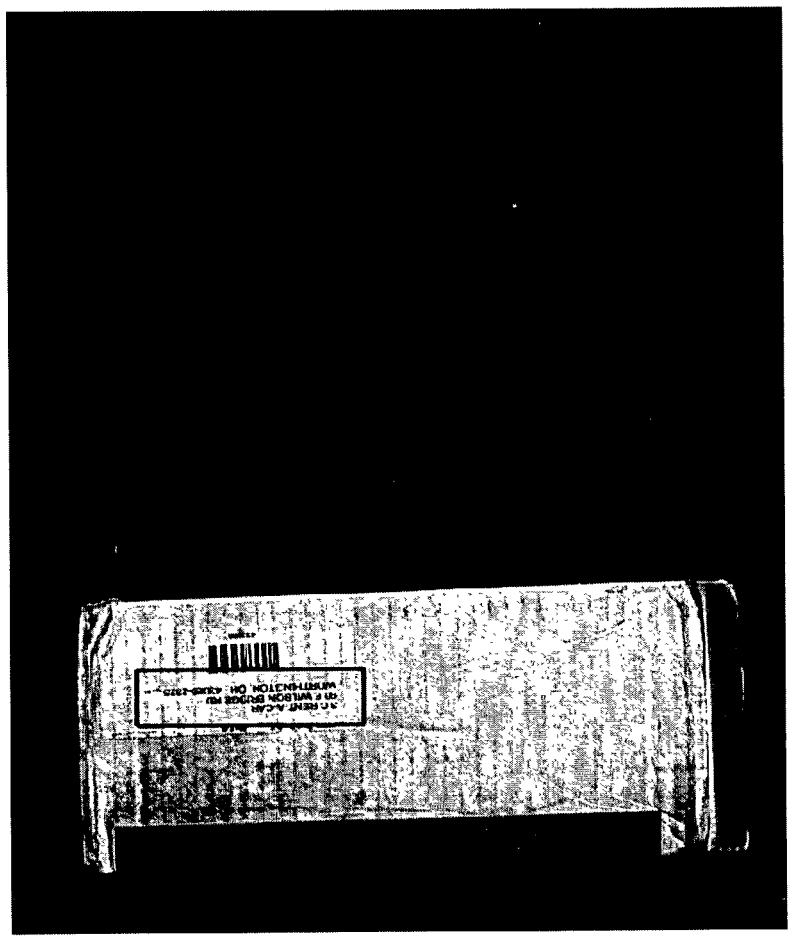
FIG. 3a depicts an original image with an address block indicated.
Figure 3B:
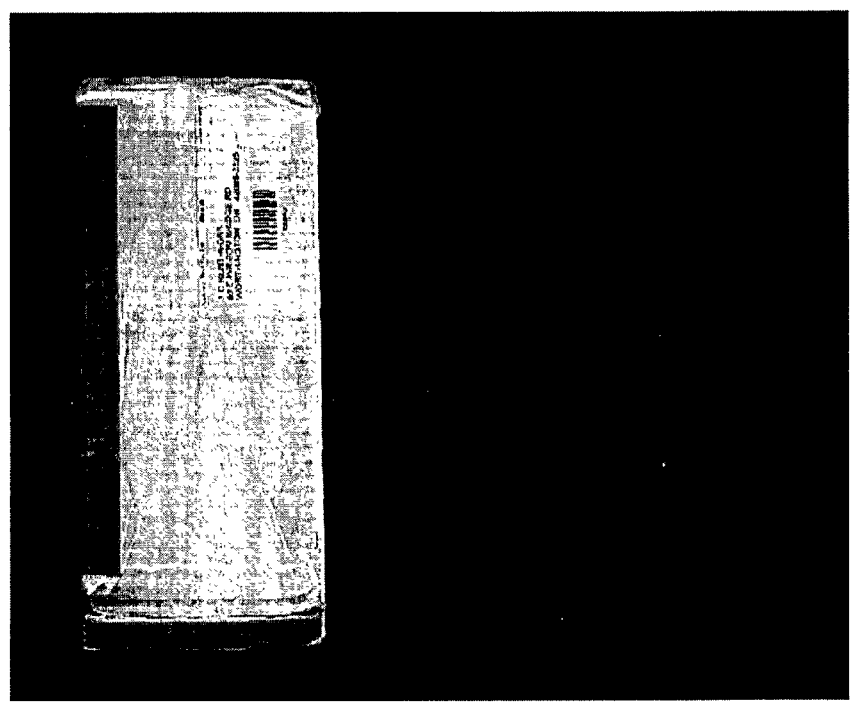
FIG. 3b depicts the image of FIG. 3a after being rotated by an angle equal to the orientation angle as obtained by an embodiment of this invention; and, FIG. 4 is a block diagram representative of an embodiment of the system of this invention.

FIG. 3a depicts an original image with an address block indicated. The object imaged is an addressed piece whose image has been acquired by scanning means, such as a CCD array and an illumination system, and the address block has been located using an address location method such as that detailed in U.S. Pat. No. 5,386,482, or U.S. Pat. No. 6,014,450, for example. The scanned image of the address block is then processed according to the method of FIG. 1 (and as described in the preceding discussion). The image is then rotated by an angle equal to the orientation angle of the image and in a direction that yields a rotated image with a substantially null orientation angle and the result is shown in FIG. 3b.

The method of this invention can be implemented in a system for detecting an orientation angle of an image. The system of this invention comprises means for acquiring the image, means for determining image centroid coordinates, means for obtaining second order moments corresponding to the image, where the second order moments utilizing the image centroid coordinates, and, means for determining an orientation angle of the principal axis of the image, where the orientation angle of the image is given by the orientation angle of the principal axis. Means for acquiring an image include raster scan devices examples of which the acquisition devices in video cameras, area and line acquisition devices such as CCDs and CMOS imaging devices. Once the image is acquired, the acquired signal is an electronic representation of the image. The electronic image signal is then processed to obtain first order moments, centroid coordinates, second order moments, and the orientation angle of the principal axis of the image. The processing can be achieved by digital means if the electronic signal comprises a two dimensional array of discrete image values. Similarly, the processing can be achieved by combined analog and digital means if the electronic signal comprises a series of one-dimensional signals as in the case of a raster scanned image. The digital means can be dedicated digital circuits or computer readable code embodied in a computer usable medium that would cause a computer system to obtain first order moments, centroid coordinates, second order moments, and the orientation angle of the principal axis of the image. The computer system can be one or many processors or a dedicated digital signal processor.

The equations representing the first and second order moments of the image are in a form amenable to translation into computer readable code in a higher level language (such as C or C++). One skilled in the art would recognize the equivalence of summations and the loops obtained using control expressions so much as do, if, and for statements available in higher level languages. Similarly, approximations for the inverse tangent are available in higher level computer languages. Once a higher level language computer readable code is obtained to process the electronic in which signal in order to yield first order moments, centroid coordinates, second order moments, and the orientation angle of the principal axis of the image, the higher level language computer readable code can be translated to the machine language of any processor utilizing means known in the art (such as development systems). It should be noted that other embodiments are also possible such as the use of the higher level language computer readable code in conjunction with and interpreter or compiler instead of machine language code.

In the embodiment in which the processing is achieved by combined analog and digital means, the combined means can be analog circuits such as operational amplifiers or analog-to-digital (A-to-D) converters and digital circuits or computer readable code embodied in a computer usable medium and processor.

Figure 4:
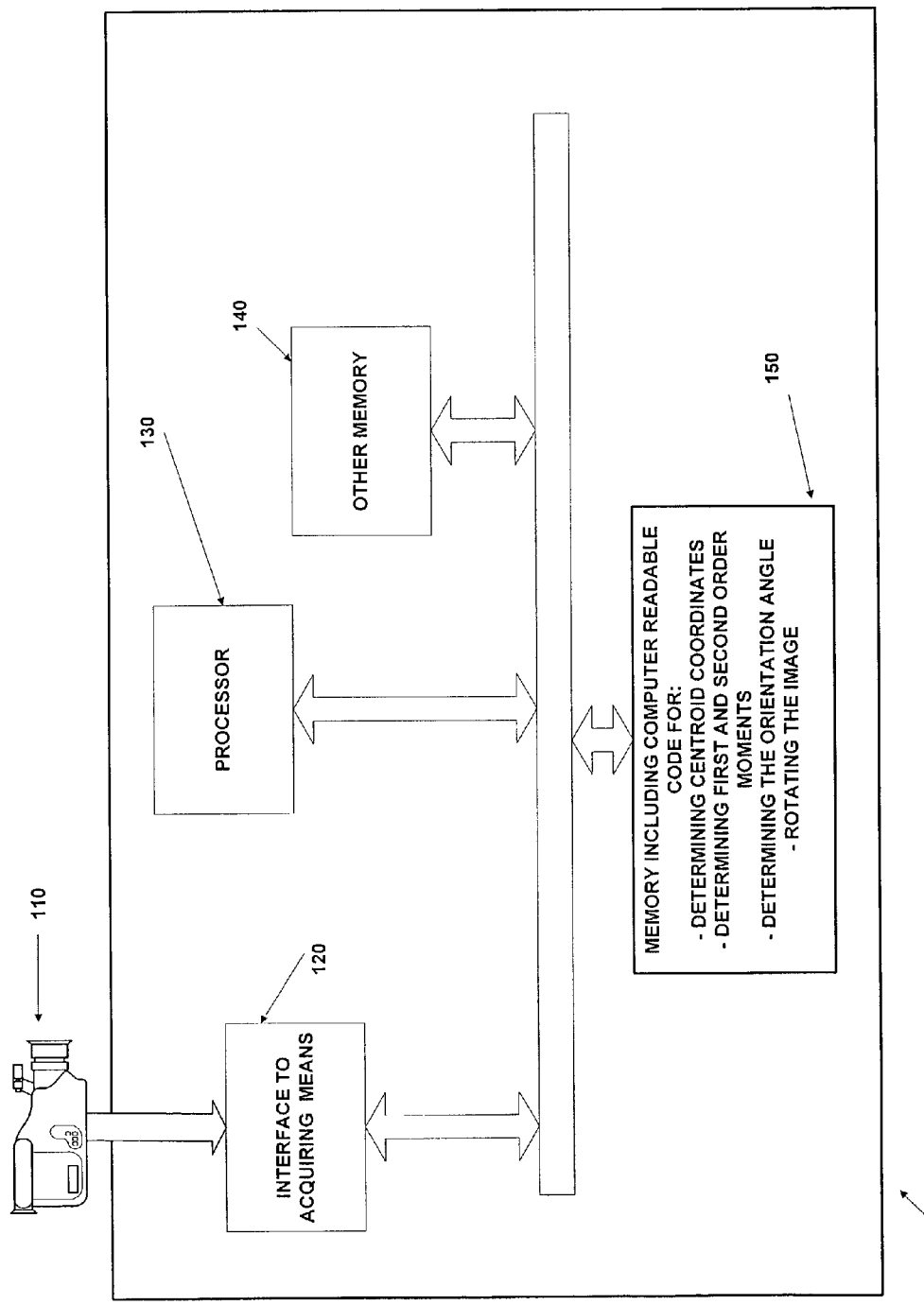

FIG. 4 depicts a block diagram representative of an embodiment of the system 100 of this invention. Acquiring means 110 (means comprising area and line acquisition devices such as CCDs and CMOS imaging devices, in one embodiment) are coupled to a computer enabled system 100 (herein after called a computer system) by an interface unit 120. The interface unit 120 receives the electronic image data (not shown) from the acquiring means 110 and converts it to digital data in a form that can be processed by processor 130. Processor 130 can comprise one or many processing units. Memory 150 is a computer usable medium and has computer readable code embodied therein for determining the orientation angle of the image. The computer readable code causes the processor 130 to obtain first order moments, centroid coordinates, second order moments, and the orientation angle of the principal axis of the image. Other memory 140 is used for other system functions (for example, control of other processes, data and event logging, user interface, and other "housekeeping" functions) and could be implemented by means of any computer readable media. In another embodiment of the system, dedicated digital circuits (embodied in an ASIC or an FPGA) could be used to implement the methods for determining the orientation angle of the image.

The embodiment shown in FIG. 4 can be easily modified for other representations of the electronic signal. For example, if the electronic signal is a raster scanned signal, computer system 100 is replaced by a mixed signal (analog and digital) system. The mixed signal system can comprise both analog (such as operational amplifiers) and digital processing circuits or it can comprise analog-to-digital converters (A/D) and a digital processing system such as that of FIG. 4.

In the system of FIG. 4, memory 150 also has computer readable code embodied therein for rotating the image. The computer readable code constitutes an embodiment of means for rotating the image, whereby the rotation corrects the orientation of the image. It should be noted that other means could be used. For example, the rotations means described in U.S. Pat. No. 5,889,893, or in U.S. Pat. No. 5,715,385, or in U.S. Pat. No. 5,295,237 could be used. Or, the means described in U.S. Pat. No. 6,310,986 could be used to assist in the rotation of the image. In still another embodiment of the rotation means, dedicated digital circuits (embodied in an ASIC or an FPGA) could be used to implement one of the variety of methods for rotating an image.

In general, the techniques described above may be implemented, for example, in hardware, software, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to data entered using the input device to perform the functions described and to generate output information. The output information may be applied to one or more output devices.

Elements and components described herein may be further divided into additional components or joined together to form fewer components for performing the same functions.

Each computer program within the scope of the claims below may be implemented in any programming language, such as assembly language, machine language, a high-level procedural programming language, or an object-oriented programming language. The programming language may be a compiled or interpreted programming language.

Each computer program may be implemented in a computer program product tangibly embodied in a computer-readable storage device for execution by a computer processor. Method steps of the invention may be performed by a computer processor executing a program tangibly embodied on a computer-readable medium to perform functions of the invention by operating on input and generating output.

Common forms of computer-readable or usable media include, for example, a floppy disk, a flexible disk, hard disk, magnetic tape, or any other magnetic medium, a CDROM, any other optical medium, punched cards, paper tape, any other physical medium with patterns of holes, a RAM, a PROM, and EPROM, a FLASH-EPROM, any other memory chip or cartridge, a carrier wave, or any other medium from which a computer can read.

Although the invention has been described with respect to various embodiments, it should be realized this invention is also capable of a wide variety of further and other embodiments within the spirit and scope of the appended claims.

What is claimed is:

1. A method of detecting an orientation angle of an image, said method comprising the steps of:
   determining image centroid coordinates;
   obtaining second order moments corresponding to the image and to the image centroid coordinates; and,
   determining an orientation angle of a principal axis of the image;
   obtaining the orientation angle of the image from the orientation angle of the principal axis; and
   rotating the image by an angle equal to the orientation angle of the image and in a direction that yields a rotated image with a substantially null orientation angle of the image after rotation;
   whereby said method is readily implemented with reduced computational complexity and the rotation of the image corrects the orientation of the image.

2. The method of claim 1 further comprising the step of representing said image as a plurality of pixels, each one of said plurality of pixels having at least one corresponding image value.

3. The method of claim 2 wherein said at least one corresponding image value comprises a luminance value at each one of said plurality of pixels.

4. A system for detecting an orientation angle of an image, said system comprising:
   means for acquiring the image;
   means for determining image centroid coordinates;
   means for obtaining second order moments corresponding to the image, said second order moments utilizing the image centroid coordinates;
   means for determining an orientation angle of a principal axis of the image, wherein the orientation angle of the image is given by the orientation angle of the principal axis; and
   means for rotating the image;
   whereby the rotation corrects the orientation of the image.

5. The system of claim 4 wherein said image comprises a plurality of pixels, each one of said plurality of pixels having at least one corresponding image value.

6. The system of claim 5 wherein said at least one corresponding image value comprises a luminance value at each one of said plurality of pixels.

7. A computer usable medium having computer readable code embodied therein for detecting an orientation angle of an image, said code causing a computer system to:
   determine image centroid coordinates;
   obtain second order moments corresponding to the image, said second order moments utilizing the image centroid coordinates; and,
   determine an orientation angle of a principal axis of the image, wherein the orientation angle of the image is given by the orientation angle of the principal axis; and
   rotate the image by an angle equal to the orientation angle of the image and in a direction that yields a rotated image with a substantially null orientation angle.

8. The computer program product of claim 7 wherein said image comprises luminance data.

9. A method of detecting an orientation angle of an address block on an addressed item, said method comprising the steps of:
   acquiring an image of the addressed item;
   locating an address block image in the image of the addressed item;
   determining address block image centroid coordinates;
   obtaining second order moments corresponding to the address block image and to the address block image centroid coordinates; and,
   determining an orientation angle of a principal axis of the address block image;
   obtaining the orientation angle of the address block from the orientation angle of the principal axis; and
   rotating the image of the addressed item by an angle equal to the orientation angle of the address block and in a direction that yields a rotated image with a substantially null orientation angle of the address block after rotation;
   whereby said method is readily implemented with reduced computational complexity and whereby the rotation of the addressed item image corrects the orientation of the address block.

10. A method of detecting an orientation angle of an address block on an addressed item, said method comprising the steps of:
    acquiring an image of the addressed item;
    locating an address block image in the image of the addressed item;

representing the address block image as an n-by-m two dimensional array of discrete image values, $f(x_i,y_j)$, where i is selected from the group consisting of 1 through n, and, j is selected from the group consisting of 1 through m, and, $x_i$, $y_j$ represent position coordinate values for the image value $f(x_i,y_j)$;

obtaining zeroth order moments, $m_{00}, m_{01}, m_{10}$, from the equations $$m_{00} = \sum_{i=1}^{i=n} \sum_{j=1}^{j=m} f(x_i, y_j),$$

$$m_{10} = \sum_{i=1}^{i=n} \sum_{j=1}^{j=m} x_i f(x_i, y_j),$$

$$m_{01} = \sum_{i=1}^{i=n} \sum_{j=1}^{j=m} y_j f(x_i, y_j);$$

determining image centroid coordinates, $x_0, y_0$, from the equations $$x_0 = \frac{m_{10}}{m_{00}},$$

$$y_0 = \frac{m_{01}}{m_{00}};$$

obtaining second order moments, $\mu_{11}, \mu_{20}$ and $\mu_{02}$, corresponding to the image from the equation $$\mu_{pq} = \sum_{i=1}^{i=n} \sum_{j=1}^{j=n} (x_i - x_0)^p (y_j - y_0)^q f(x_i, y_j),$$

where p and q are selected from the group consisting of 0, 1, and 2;

determining an orientation angle, $\theta$, of a principal axis of the image from the equation $$\theta = \frac{1}{2} \tan^{-1}\left(\frac{2\mu_{11}}{\mu_{20} - \mu_{02}}\right);$$

obtaining the orientation angle of the address block from the orientation angle of the principal axis; and rotating the image of the addressed item by an angle equal to the orientation angle of the address block and in a direction that yields a rotated image with a substantially null orientation angle of the address block after rotation;

whereby said method is readily implemented with reduced computational complexity and whereby the rotation of the addressed item image corrects the orientation of the address block.

\* \* \* \* \*

UNITED STATES PATENT AND TRADEMARK OFFICE
CERTIFICATE OF CORRECTION

PATENT NO. : 7,068,856 B2
APPLICATION NO. : 10/245426
DATED : June 27, 2006
INVENTOR(S) : Lawrence E. Albertelli et al.

It is certified that error appears in the above-identified patent and that said Letters Patent is hereby corrected as shown below:

Column 8, line 36 (Claim 8), "computer program product" should read --computer usable medium--;

Column 9, line 1 (Claim 10), "n-by-in" should read --n-by-m--;

Column 10, line 5 (Claim 10), "$\mu_{pq} = \sum_{i=1}^{i=n}\sum_{j=1}^{j=n}(x_i - x_0)^p(y_j - y_0)^q f(x_i, x_j)$" should read --$\mu_{pq} = \sum_{i=1}^{i=n}\sum_{j=1}^{j=m}(x_i - x_0)^p(y_j - y_0)^q f(x_i, x_j)$--

Signed and Sealed this

Fourteenth Day of August, 2007

JON W. DUDAS
*Director of the United States Patent and Trademark Office*